United States Patent
Kim et al.

(10) Patent No.: US 11,156,961 B2
(45) Date of Patent: Oct. 26, 2021

(54) METHOD AND APPARATUS FOR PROCESSING HOLOGRAM IMAGE DATA

(71) Applicants: SAMSUNG ELECTRONICS CO., LTD., Suwon-si (KR); University of Seoul Industry Cooperation Foundation, Seoul (KR)

(72) Inventors: Hojung Kim, Suwon-si (KR); Kichul Kim, Seoul (KR); Yongkyu Kim, Hwaseong-si (KR); Hongseok Lee, Seoul (KR)

(73) Assignees: SAMSUNG ELECTRONICS CO., LTD., Suwon-si (KR); University of Seoul Industry Cooperation Foundation, Seoul (KR)

( * ) Notice: Subject to any disclaimer, the term of this patent is extended or adjusted under 35 U.S.C. 154(b) by 298 days.

(21) Appl. No.: 16/361,422

(22) Filed: Mar. 22, 2019

(65) Prior Publication Data
US 2020/0103825 A1    Apr. 2, 2020

(30) Foreign Application Priority Data

Sep. 27, 2018    (KR) .................. 10-2018-0115338

(51) Int. Cl.
*G03H 1/04*    (2006.01)
*G02B 27/00*    (2006.01)
(Continued)

(52) U.S. Cl.
CPC ....... *G03H 1/0486* (2013.01); *G02B 27/0093* (2013.01); *G02B 27/0103* (2013.01);
(Continued)

(58) Field of Classification Search
CPC .. G03H 1/0486; G03H 1/0406; G03H 1/2249; G03H 1/268; G03H 2210/40;
(Continued)

(56) References Cited

U.S. PATENT DOCUMENTS

2002/0159108 A1* 10/2002 Baba ................. G03H 1/268
359/9
2014/0085692 A1* 3/2014 Lee ................... G03H 1/2202
359/23

(Continued)

FOREIGN PATENT DOCUMENTS

EP    3 270 234 A2    1/2018
EP    3 270 234 A3    1/2018
(Continued)

OTHER PUBLICATIONS

Communication dated Nov. 8, 2019 by the European Patent Office in counterpart European Patent Application No. 19197681.0.

*Primary Examiner* — Jade R Chwasz
(74) *Attorney, Agent, or Firm* — Sughrue Mion, PLLC (57) ABSTRACT

A method and apparatus for processing hologram image data capable of optimizing image quality of a hologram image are provided. The image processing method includes receiving input image data, reading a header included at a predetermined location in the input image data, and generating hologram data configured to display a hologram image by performing a Fourier calculation and pixel encoding on the input image data based on at least one parameter recorded in the header, wherein the at least one parameter recorded in the header includes at least one of depth information, scale information, and gamma information.

24 Claims, 10 Drawing Sheets

(51) Int. Cl.
    *G02B 27/01* (2006.01)
    *G03H 1/22* (2006.01)
    *G06T 5/10* (2006.01)

(52) U.S. Cl.
    CPC ......... *G03H 1/0406* (2013.01); *G03H 1/2249* (2013.01); *G06T 5/10* (2013.01)

(58) Field of Classification Search
    CPC ......... G03H 2210/44; G03H 2210/441; G03H 2210/45; G03H 2001/0204; G03H 1/02; G02B 27/0093; G02B 27/0103; G06T 5/10
    See application file for complete search history.

(56) References Cited

U.S. PATENT DOCUMENTS

2017/0091916 A1* 3/2017 Kim .................. G06T 5/10
2018/0018829 A1 1/2018 Kim et al.

FOREIGN PATENT DOCUMENTS

| KR | 10-0973031 B1 | 7/2010 |
| KR | 10-2013-0099650 A | 9/2013 |
| KR | 10-2016-0142626 A | 12/2016 |
| KR | 10-2018-0057550 A | 5/2018 |

* cited by examiner

METHOD AND APPARATUS FOR PROCESSING HOLOGRAM IMAGE DATA

CROSS-REFERENCE TO RELATED APPLICATION

This application claims priority from Korean Patent Application No. 10-2018-0115338, filed on Sep. 27, 2018 in the Korean Intellectual Property Office, the disclosure of which is incorporated herein in its entirety by reference.

BACKGROUND

1. Field

Example embodiments of the present disclosure relate to a method and apparatus for processing hologram image data, and more particularly to, a method and apparatus for processing hologram image data capable of optimizing quality of a hologram image.

2. Description of the Related Art

Methods such as glasses-type methods and non-glasses-type methods are widely used for realizing 3D images. Examples of glasses-type methods include deflected glasses-type methods and shutter glasses-type methods, and examples of non-glasses-type methods include lenticular methods and parallax barrier methods. When these methods are used, there is a limit to the number of viewpoints that may be implemented due to binocular parallax. Also, these methods make the viewers feel tired due to the difference between the depth perceived by the brain and the focus of the eyes.

Recently, holographic 3D image display methods, which provide full parallax and are capable of making the depth perceived by the brain consistent with the focus of the eyes, have been gradually put to practical use. According to such a holographic display technique, when light is irradiated onto a hologram pattern having recorded thereon an interference pattern obtained by interference between light and object light reflected from an original object, the light is diffracted and an image of the original object is reproduced. When a currently commercialized holographic display technique is used, a computer-generated hologram (CGH), rather than a hologram pattern obtained by directly exposing an original object to light, is provided as an electrical signal to a spatial light modulator. Then, the spatial light modulator forms a hologram pattern and diffracts light according to an input CGH signal, thereby generating a 3D image.

To generate CGHs, image processing apparatuses perform a very large number of computations to compute a hologram value for each location in a hologram plane. Thus, when image processing is performed, a large number of computations takes a lot of time. Accordingly, various methods of reducing the number of computations and the computation time are attempted when image processing is performed.

SUMMARY

One or more example embodiments provide a method and apparatus for processing hologram image data.

According to an aspect of an example embodiment, there is provided an image processing method including receiving input image data, reading a header included at a predetermined location in the input image data, and generating hologram data configured to display a hologram image by performing a Fourier calculation and pixel encoding on the input image data based on at least one parameter recorded in the header, wherein the at least one parameter recorded in the header includes at least one of depth information, scale information, and gamma information.

The header may further include an identification code, and wherein the reading of the header including reading the identification code in the header, determining whether the identification code recorded in the header is equal to a predetermined identification code, and storing the at least one parameter recorded in the header in a memory when the identification code recorded in the header is equal to the predetermined identification code or storing a predetermined default parameter in the memory when the identification code recorded in the header is not equal to the predetermined identification code.

The input image data may include color image data and depth image data, and wherein the header may be included in a data region of the color image data, a data region of the depth image data, an unused region of the color image data, or an unused region of the depth image data.

The generating the hologram data may include performing a first Fourier calculation based on a distance between the observer's pupil and a retina, performing a focus term calculation and a depth addition using the depth information, and performing a second Fourier calculation based on a distance between a display panel configured to display the hologram image and an observer's pupil.

The depth information may include location information of a plurality of depth layers of the hologram image.

The depth information may include values of a plurality of focus terms corresponding to a location of a plurality of depth layers of the hologram image.

A plurality of combinations of focus terms corresponding to a plurality of location combinations with respect to the plurality of depth layers may be predefined, and wherein the depth information may correspond to any one of the plurality of combinations of the focus terms.

The generating of the hologram data may further include performing scaling transformation on a first complex image having a first resolution generated by the second Fourier calculation to a second complex image having a second resolution higher than the first resolution, wherein scaling transformation may be performed based on the scale information.

The generating of the hologram data may further include performing pixel encoding on complex values of a second complex image having the second resolution to integer values, and wherein the performing of the pixel encoding may include adjusting a brightness of a hologram image based on the gamma information.

The input image data may include a plurality of frames respectively including a header, and wherein parameters recorded in headers of the plurality of frames may be different from each other.

A non-transitory computer-readable recording medium having recorded thereon a computer program which, on a computer, may perform the image processing method.

According to an aspect of an example embodiment, there is provided an image processing apparatus including a processor configured to read a header included at a predetermined location in input image data and generate hologram data configured to display a hologram image by performing a Fourier calculation and pixel encoding based on at least one parameter recorded in the header, and a memory, wherein the at least one parameter recorded in the header includes at least one of depth information, scale information, and gamma information.

The header may include an identification code, and the processor may be further configured to determine whether the identification code recorded in the header is equal to a predetermined identification code, and store the at least one parameter recorded in the header in a memory when the identification code recorded in the header is equal to the predetermined identification code or store a predetermined default parameter in the memory when the identification code recorded in the header is not equal to the predetermined identification code.

The processor may be further configured to perform a first Fourier calculation based on a distance between the observer's pupil and a retina, perform a focus term calculation and a depth addition based on the depth information, and perform a second Fourier calculation based on a distance between a display panel configured to display the hologram image and an observer's pupil.

The depth information may include location information of a plurality of depth layers of the hologram image.

The depth information may include values of a plurality of focus terms each corresponding to a location of a plurality of depth layers of the hologram image.

A plurality of combinations of focus terms corresponding to a plurality of location combinations with respect to the plurality of depth layers may be predefined, and the depth information may correspond to any one of the plurality of combinations of the focus terms.

The processor may be further configured to perform scaling transformation on a first complex image having a first resolution generated by the second Fourier calculation to a second complex image having a second resolution higher than the first resolution, based on the scale information.

The processor may be further configured to encode complex values of a second complex image having the second resolution to integer values, and adjust a brightness of a hologram image based on the gamma information.

The image processing apparatus may further include a camera configured to capture an image and obtain image data, wherein the camera is further configured to insert a header having a predetermined parameter value for a mode selected by a user into the image data or automatically determine a parameter value and insert the header having the determined parameter value into the image data.

According to an aspect of an example embodiment, there is provided an image processing method including receiving input image data including a header, reading the header including an identification code, and generating hologram data configured to display a hologram image by performing a Fourier calculation and pixel encoding on the input image data based on at least one parameter included in the header, wherein the at least one parameter includes at least one of depth information, scale information, and gamma information, and wherein the reading of the header includes determining whether the identification code included in the header is equal to a predetermined identification code, and generating the hologram image based on the at least one parameter when the identification code is equal to the predetermined identification code, and generating the hologram image based on a predetermined default parameter included in a memory when the identification code is not equal to the predetermined identification code.

The generating the hologram data includes performing a first Fast Fourier Transformation (FFT), performing a focus term calculation and a depth addition using the depth information, and performing a FFT.

The depth information may include location information of a plurality of depth layers of the hologram image.

BRIEF DESCRIPTION OF THE DRAWINGS

The above and/or other aspects will become apparent and more readily appreciated from the following description of example embodiments, taken in conjunction with the accompanying drawings in which.

DETAILED DESCRIPTION

Reference will now be made in detail to example embodiments, examples of which are illustrated in the accompanying drawings, wherein like reference numerals refer to like elements throughout. In this regard, the example embodiments may have different forms and should not be construed as being limited to the descriptions set forth herein. Accordingly, the embodiments are merely described below, by referring to the figures, to explain aspects.

Hereinafter, with reference to the accompanying drawings, a holographic display apparatus for providing an expanded viewing window will be described in detail. Like reference numerals refer to like elements throughout, and in the drawings, sizes of elements may be exaggerated for clarity and convenience of explanation. The example embodiments described below are merely exemplary, and various modifications may be possible from the example embodiments. In a layer structure described below, an expression "above" or "on" may include not only "immediately on in a contact manner" but also "on in a non-contact manner".

The terms used herein are those general terms currently widely used in the art in consideration of functions in regard to the example embodiments, but the terms may vary according to the intentions of those of ordinary skill in the art, precedents, or new technology in the art. Also, in some cases, there may be terms that are optionally selected by the applicant, and the meanings thereof will be described in detail in the corresponding portions of the description of the example embodiments. Thus, the terms used herein should be understood not as simple names but based on the meaning of the terms and the overall description of the example embodiments.

Also, when something is referred to as "including" a component, another component may be further included unless specified otherwise. Also, as used herein, the terms "units" and "modules" may refer to units that perform at least one function or operation, and the units may be implemented as hardware or software or a combination of hardware and software.

Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. The use of the terms "a" and "an" and "the" and similar referents in the context of describing the present disclosure are to be construed to cover both the singular and the plural.

Figure 1:
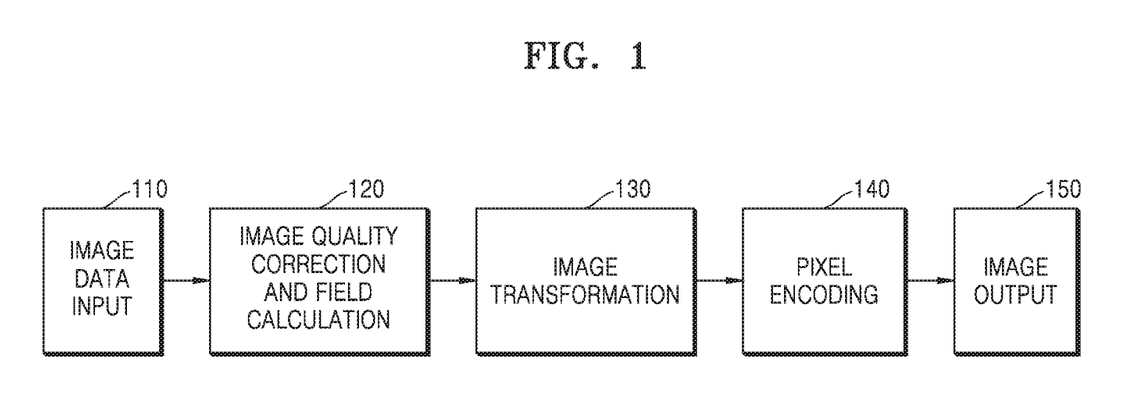
FIG. 1 is a schematic view illustrating a process of processing image data, according to an example embodiment.

FIG. 1 is a schematic view illustrating a process of processing hologram image data according to an example embodiment. Referring to FIG. 1, an image processing apparatus for processing the hologram image data may receive image data and output an image on which image processing has been performed.

In operation 110, the image processing apparatus may receive the image data. The image processing apparatus may receive the image data in units of frames. In other words, the image processing apparatus may receive and process image data of one frame, and then receive and process image data of a subsequent frame. For example, in computer-generated hologram (CGH), when a layer-based algorithm is applied to image data, the image data may include color image data and depth image data. The color image data may be data representing a plurality of colors for a plane of each layer. For example, the color image data may include red image data, blue image data, and green image data.

Figure 2:
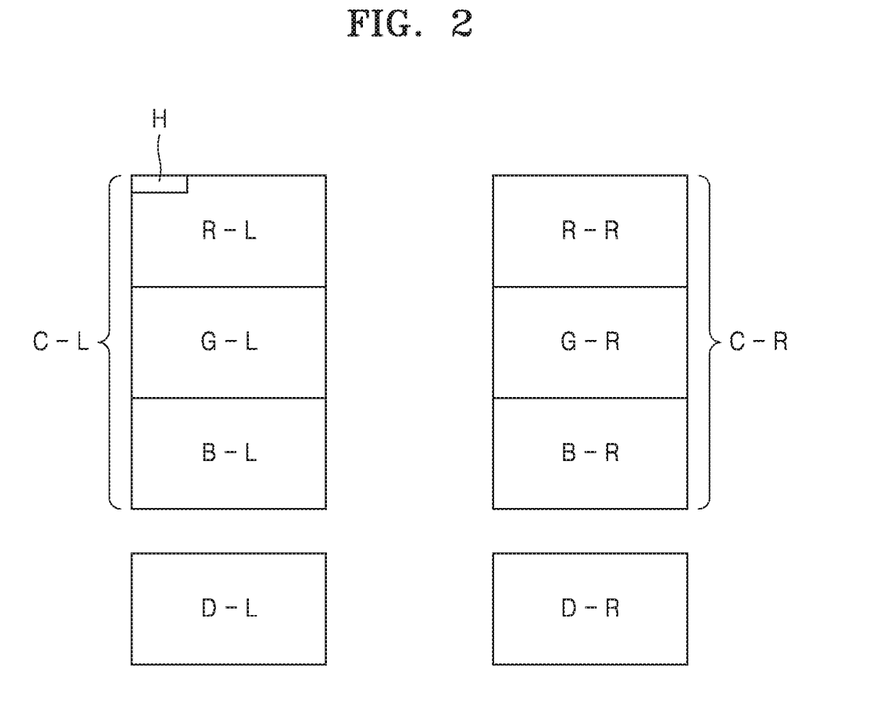
FIG. 2 illustrates an example of a structure of input image data according to an example embodiment.

For example, FIG. 2 illustrates an example of a structure of input image data according to an example embodiment. Referring to FIG. 2, the input image data may include left eye color image data C-L, left eye depth image data D-L, right eye color image data C-R, and right eye depth image data D-R. The left eye color image data C-L may include left eye red image data R-L, left eye green image data G-L, and left eye blue image data B-L. The right eye color image data C-R may include right eye red image data R-R, right eye green image data G-R, and right eye blue image data B-R.

According to an example embodiment, the input image data may further include a header H containing parameters applied to a CGH calculation. For example, as shown in FIG. 2, the header H may be located at a head portion in a data region of the left eye red image data R-L. However, this is only an example, and a specific location of the header H is not limited thereto. The header H may be at another location in the data region of the left eye red image data R-L. Alternatively, the header H may be located in another data region of the input image data other than the left-eye red image data R-L. For example, the header H may be at a predetermined specific location in a data region of the left eye green image data G-L, the left eye blue image data B-L, the left eye depth image data D-L, the right eye red image data R-R, the right eye green image data G-R, the right eye blue image data B-R, or the right eye depth image data D-R.

Figure 3:
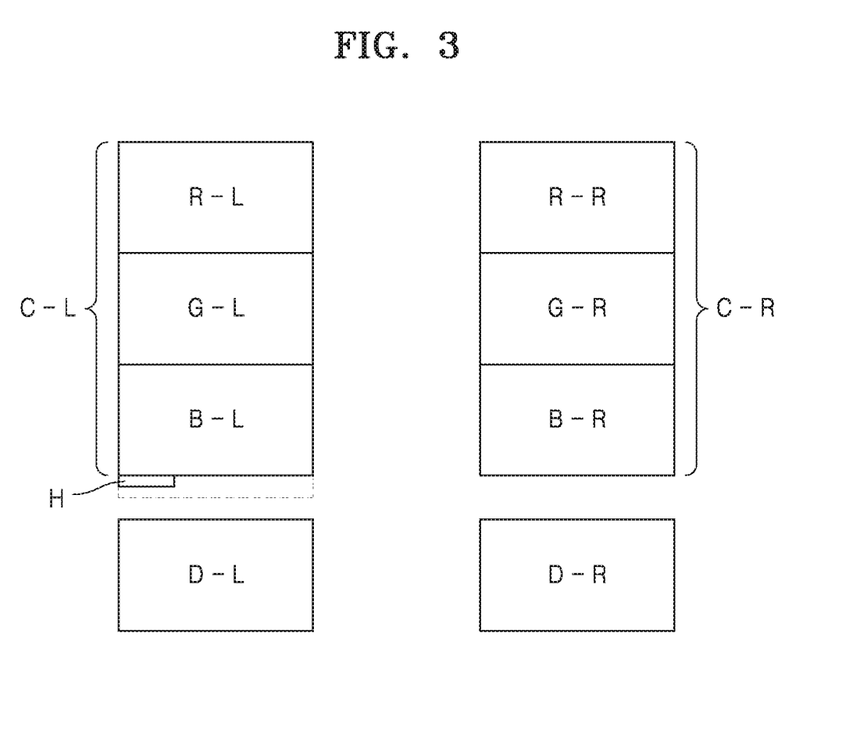
FIG. 3 illustrates an example of a structure of input image data according to an example embodiment.

FIG. 3 illustrates an example of a structure of input image data according to an example embodiment. As shown in FIG. 3, the header H may be located within an unused region of the left eye color image data C-L. However, this is only an example, and a specific location of the header H is not limited thereto. For example, the header H may be located within an unused region of the left eye depth image data D-L, an unused region of the right eye color image data C-R, or an unused region of the right eye depth image data D-R.

A CGH calculation that will be described later may be performed by applying parameter values recorded in the header H. These parameters may have preselected values such that an image of a frame with optimal quality is reproduced using a CGH generated through the CGH calculation. For example, when a user directly selects a specific mode according to a scene to be captured when capturing an object of interest using a camera, the camera may insert the header H having a predetermined parameter value for the selected mode into the image data. Instead, the camera may automatically determine a parameter value according to the scene to be captured and insert the header H having the determined parameter value into the image data.

Figure 4:
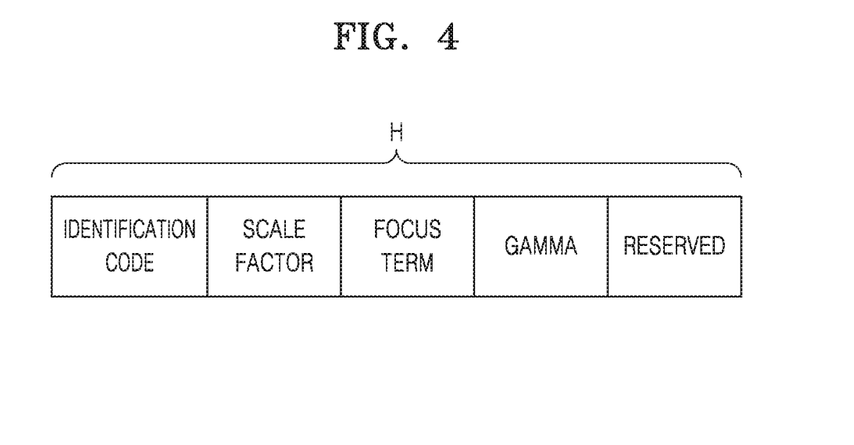
FIG. 4 shows an example of a data structure of a header in input image data.

FIG. 4 shows an example of a data structure of the header H in input image data. Referring to FIG. 4, the header H may include an identification code, scale factor information, focus term information, gamma information, and a reserved region.

The identification code may be used to determine whether an image processing method according to the example embodiment is applied to image data. When the identification code is equal to a predetermined identification code, it may be determined that the image processing method according to the example embodiment is applied to the image data. Then, an image processing apparatus may perform a CGH calculation by applying the scale factor, the focus term, and the gamma information recorded in the header H. However, when the identification code is not equal to the predetermined identification code, it may be determined that the image processing method according to the example embodiment is not applied to the image data. Then, the image processing apparatus may determine that the header H is not included in the image data and may perform the CGH calculation by applying a predetermined default parameter.

The scale factor may be scale information applied in a process of scaling a resolution of an image. The focus term may be depth information that defines locations of depth layers of a hologram image to be reproduced and may be applied to a focus term calculation described later. The gamma information may be information about brightness of the hologram image to be reproduced. The reserved region may be prepared for a case where an additional part that is not used at present but is needed later for processing the input image data additionally occurs.

After receiving the image data, in operation 120, the image processing apparatus may perform image quality correction and field calculation. The image processing apparatus may correct the image data to improve image quality of the image data. Further, the image processing apparatus may read the header H at a predetermined location in the received image data. As described above, the image processing apparatus may read the identification code in the header H and determine whether the identification code recorded in the header H matches the predetermined identification code. When the identification code in the header H matches the predetermined identification code, the image processing apparatus may store a parameter recorded in the header H in a memory. Otherwise, when the identification code in the header H does not match the predetermined identification code, the image processing apparatus may store a predetermined default parameter in the memory.

In operation 130, the image processing apparatus may transform the image data using a layer-based algorithm. The layer-based algorithm may be a method of dividing a reproduction region of a hologram into a plurality of plane layers based on a depth and processing data of each divided layer. For example, the image processing apparatus may separate color image data according to layers based on depth information of the input depth image data. The number of layers to be separated may be predetermined with respect to the image processing apparatus.

Then, the image processing apparatus may perform a Fourier transform or a Fast Fourier Transform (FFT) on the color data of each of the divided plane layers. For example, the image processing apparatus may perform an FFT on a two-dimensional (2D) matrix type of image data. The image processing apparatus may perform a one-dimensional (1D) FFT twice to accomplish a 2D FFT. For example, the image processing apparatus may perform a 1D FFT on the image data row-wise and perform a 1D FFT on a result of the 1D Fourier transform column-wise. The image processing apparatus generates a hologram image via the FFT.

The image processing apparatus may include a plurality of cores. The plurality of cores may perform an FFT on the image data in parallel. For example, the image processing apparatus may assign the image data of each plane to the plurality of cores, and the plurality of cores may perform an FFT on the assigned image data.

Figure 5:
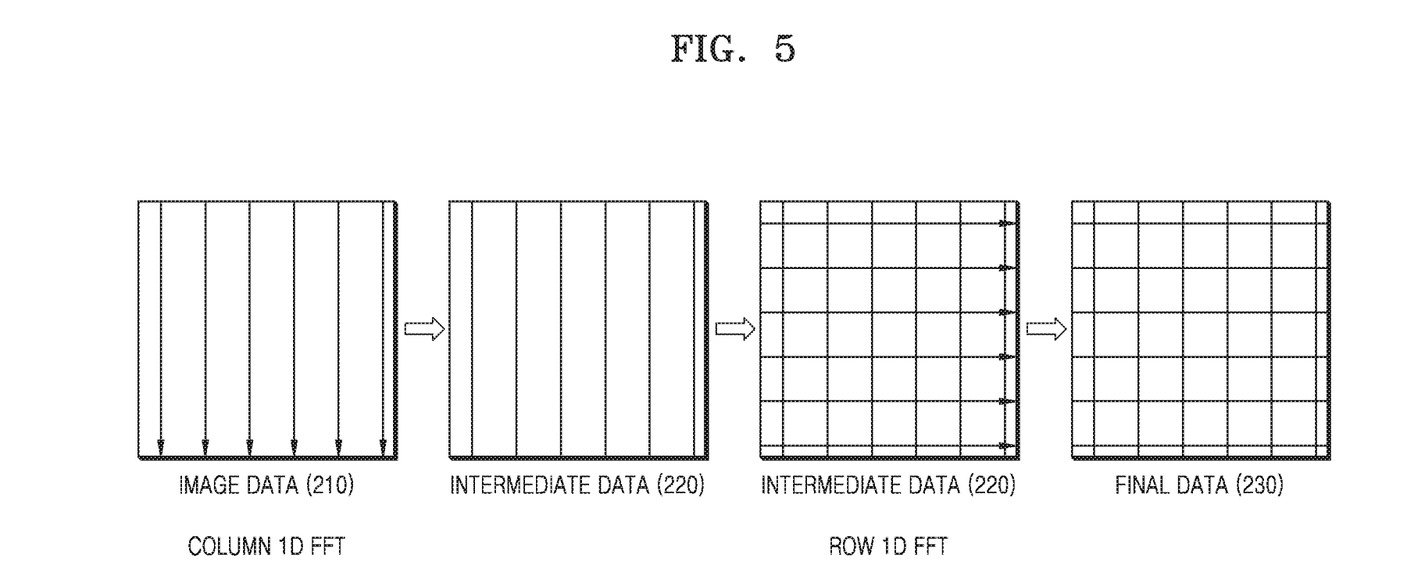
FIG. 5 illustrates an example of a process of transforming input image data.

FIG. 5 illustrates an example of a process of transforming input image data. Referring to FIG. 5, the image processing apparatus or a Fourier transform apparatus generates final data 230 by performing a 1D FFT twice on image data 210 (primary 2D FFT). For example, the image processing apparatus performs a 1D FFT once on the image data 210 in the column direction to generate intermediate data 220, and then performs a 1D FFT once on the intermediate data 220 in a row direction to generate the final data 230.

Here, the image data 210 may be color image data of one layer among color image data separated into a plurality of layers. The intermediate data 220 may represent a result of performing the 1D FFT on the image data 210 column-wise. An arrow indicated in the image data 210 may indicate a direction in which the image processing apparatus performs the 1D FFT. A straight line indicated in the intermediate data 220 may indicate a direction in which the image data 210 is transformed. The image processing apparatus may store the obtained intermediate data 220 in a memory.

Then, the image processing apparatus may read the stored intermediate data 220 from the memory and perform the 1D FFT row-wise. When reading the intermediate data 220 from the memory, the image processing apparatus may read the intermediate data 220 row-wise and output the intermediate data 220 to each 1D FFT processor. The image processing apparatus may perform the 1D FFT on the intermediate data 220 row-wise to generate the final data 230. The final data 230 may be data obtained by performing the 1D FFT on the image data 210 column-wise and row-wise.

Figure 6:
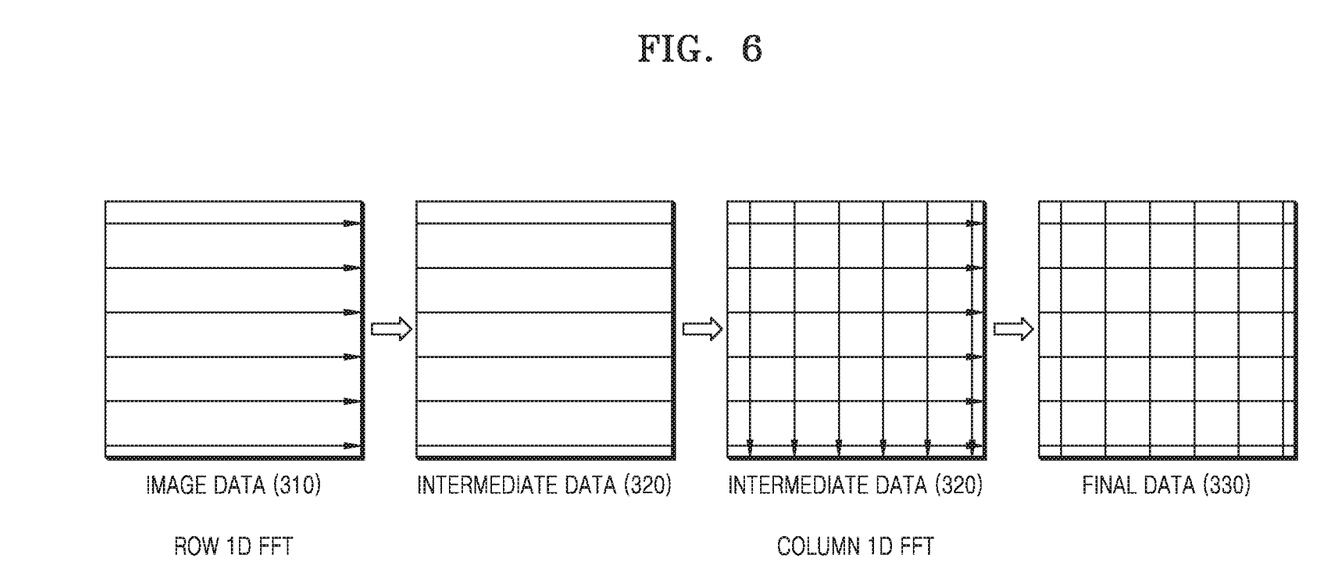
FIG. 6 illustrates an example of a process of transforming data.

In FIG. 5, for example, a case in which the image processing apparatus performs the 1D FFT first column-wise is described. However, this is merely an example. The image processing apparatus may perform the 1D FFT first row-wise. For example, FIG. 6 illustrates another example of a process of transforming data. Referring to FIG. 6, the image processing apparatus may generate final data 330 by performing the 1D FFT twice on image data 310. For example, the image processing apparatus may perform the 1D FFT once on the image data 310 row-wise to generate intermediate data 320, and then perform the 1D FFT once on the intermediate data 320 column-wise to generate the final data 330. In FIGS. 5 and 6, the order of a column and a row is switched and the description presented in FIG. 5 may be identically applied to the description of FIG. 6.

FIGS. 5 and 6 illustrate only the case where a primary 2D FFT is performed. The image processing apparatus may perform a secondary 2D FFT again after performing the primary 2D FFT. Here, the primary 2D FFT may be an FFT from an observer's pupil to an observer's retina, and the secondary 2D FFT may be an FFT from a display panel to the observer's pupil. The secondary 2D FFT may also be performed by two 1D FFTs. The secondary 2D FFT may be performed in the same row and column order as the primary 2D FFT. The order of performing the 1D FFT may be reversed in the primary 2D FFT and the secondary 2D FFT. For example, in the case where the 1D FFT is performed twice in the order of column-wise and row-wise when the primary 2D FFT is performed, when the secondary 2D FFT is performed, the 1D FFT may be performed twice in the order of row-wise and column-wise.

The image processing apparatus may perform a focus term calculation between the primary 2D FFT and the secondary 2D FFT. In the focus term calculation, the final data 230 or 330 obtained by performing the primary 2D FFT may be multiplied by a focus term value influenced by a coordinate, and then frequency filtering may be performed. For example, a focus term value multiplied by the final data 230 or 330 obtained by performing the primary 2D FFT on color image data of one layer may indicate a location of the layer depth-wise. Here, the focus term value may be determined according to focus term information read in the header H.

According to the example embodiment, locations of layers depth-wise may not be fixed. Instead, an effect of increasing a resolution depth-wise without increasing the number of layers may be obtained by changing the locations of layers depth-wise dynamically according to a depth of a main object of interest in a holographic image to be reproduced, and thus the image quality of the holographic image to be reproduced may be improved. For example, FIGS. 7A to 7E illustrate various examples of dividing a hologram reproduction region into eight layers with reference to a depth. The depth may be divided into eight planar layers, but example embodiments are not limited thereto. The depth may be expressed in several tens of layers according to a calculation capability of a calculation processing apparatus.

Figure 7A:
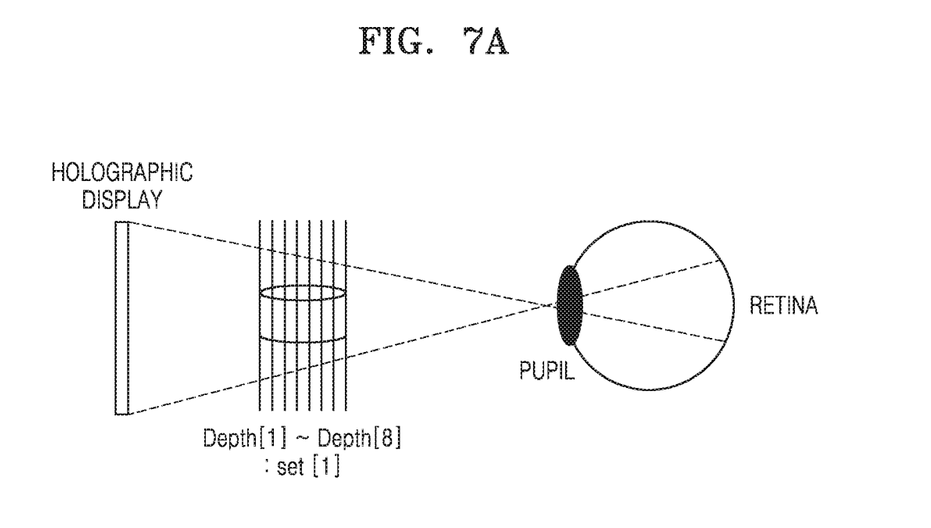
FIGS. 7A to 7E illustrate examples of dividing a hologram reproduction region into eight layers with reference to a depth.

First, referring to FIG. 7A, one object may be located at a middle depth between at a spatial light modulator, i.e., a display panel and an observer. Then, only a depth range occupied by the object between the display panel and the observer may be divided into eight equal parts depth-wise to constitute the eight layers.

Figure 7B:
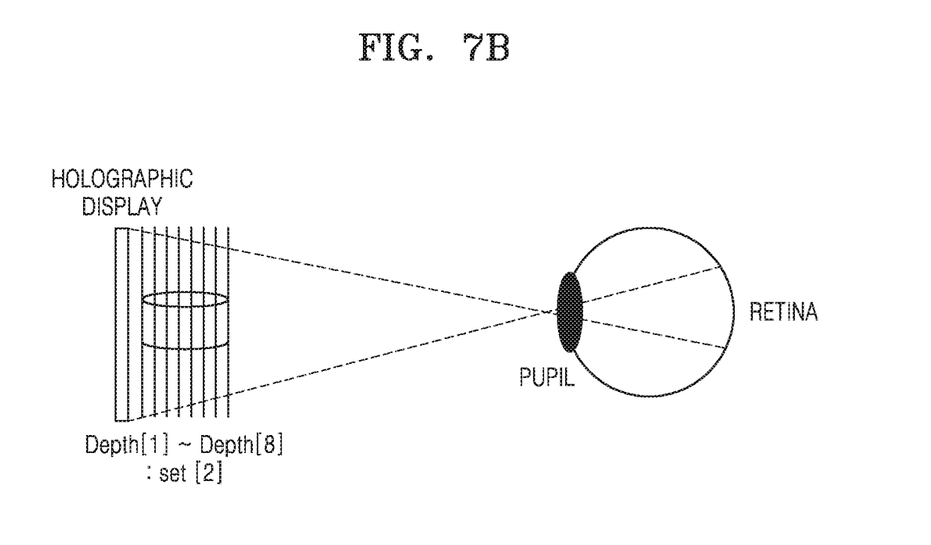

Also, referring to FIG. 7B, when an object moves closer to a front of a display panel in an image of a next frame after the frame as illustrated in FIG. 7A, locations of the eight layers may move along a depth range occupied by the object that has moved. For example, only the depth range occupied by the object in front of the display panel may be divided into eight equal parts depth-wise to constitute the eight layers. Therefore, since the locations of the depth layers move dynamically according to a location of the object in images of successive frames, a hologram image of the object of interest may be reproduced with higher quality.

Figure 7C:
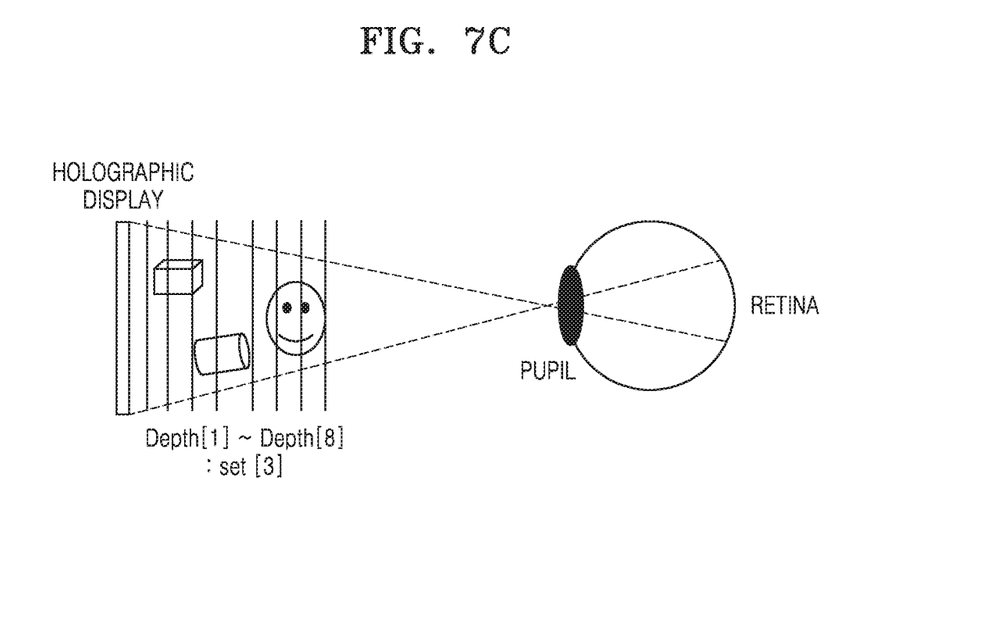

Further, referring to FIG. 7C, a plurality of objects may be distributed over a wide depth range between a display panel and an observer. In this example, a depth range between a surface of an object closest to the display panel and a surface of an object closest to the observer may be divided into eight equal parts depth-wise to constitute the eight layers.

Figure 7D:
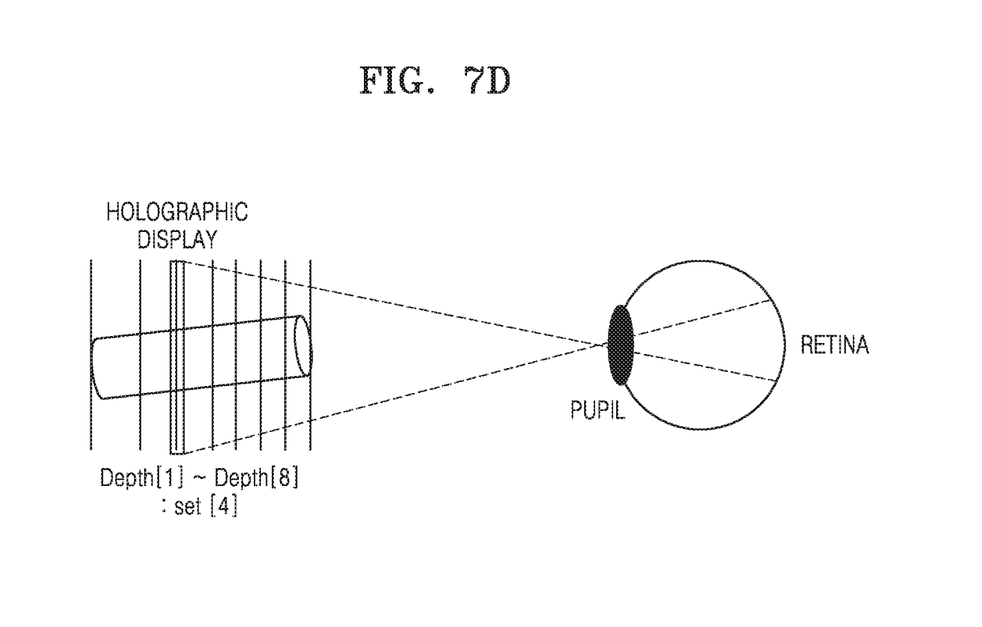

Also, referring to FIG. 7D, an object may exist over front and rear surfaces of a display panel. In this example, the object may be divided into eight equal parts depth-wise between both ends to constitute the eight layers.

Figure 7E:
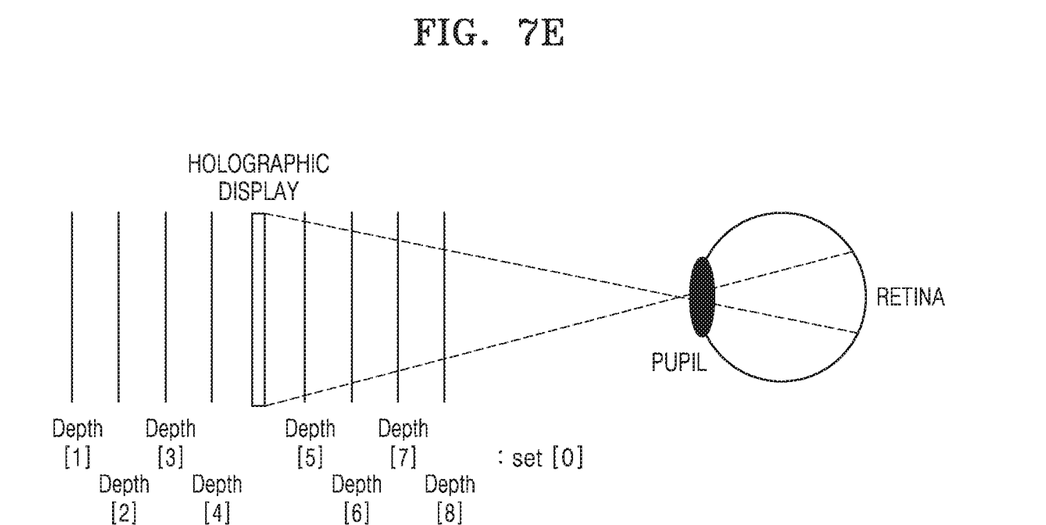

Finally, referring to FIG. 7E, when there is no object of particular interest, or when objects are distributed over an entire depth range, all reproducible depth ranges may be divided into eight equal parts depth-wise to constitute the eight layers.

As such, locations of layers may be assigned differently for successive frames. Focus term information recorded in the header H may indicate locations of the layers with respect to an image of a frame. For example, the focus term information recorded in the header H may include eight focus term values that directly indicate the locations of the eight layers. The image processing apparatus may perform a focus term calculation using values of focus terms read in the header H. For example, the image processing apparatus may multiply final data obtained by performing a primary 2D FFT on color image data corresponding to a depth [1] by a focus term value corresponding to the depth [1] read from the header H.

According to an example embodiment, various combinations of focus term values representing location combinations of various layers may be predefined. For example, a combination of the layers shown in FIG. 7A may be defined as a set [1], a combination of the layers shown in FIG. 7B may be defined as a set [2], a combination of the layers shown in FIG. 7C may be defined as a set [3], a combination of the layers shown in FIG. 7D may be defined as a set [4], and a combination of the layers shown in FIG. 7E may be defined as a set [0]. The focus term information recorded in the header H may include a set number indicating a particular combination of these multiple layers. For example, when the focus term information read in the header H indicates the set [1], the image processing apparatus may perform the focus term calculation by reading values of focus terms corresponding to the set [1] stored in a memory.

After performing the primary 2D FFT and the focus term calculation on the color image data of all layers, the image processing apparatus may perform depth addition. After performing depth addition, the image processing apparatus may perform the secondary 2D FFT on image data on which depth addition is performed. When the input image data includes left eye color image data and right eye color image data, the above-described primary 2D FFT or secondary 2D FFT may be respectively performed on the left eye color image data and the right eye color image data. After completing the secondary 2D FFT, two pieces of data obtained from the left eye color image data and the right eye color image data may be added.

In operation 140, the image processing apparatus may perform pixel encoding. The image processing apparatus may generate data that is to be input to a screen through pixel encoding. Pixel encoding may include, for example, scaling, prism phase computation, and gamma correction.

Scaling may be scaling transformation of a complex image of low resolution (e.g., FHD) into a complex image of high resolution (e.g., UHD). Specifically, interpolation may be performed on the complex image of low resolution to up-scale the complex image of low resolution to the complex image of high resolution. Up-scaling of the complex image may include performing interpolation using complex values corresponding to each pixel. For example, nearest-neighbor interpolation, bilinear interpolation, bicubic interpolation, etc. may be used.

More specifically in connection with a scaling transformation process, the image processing apparatus may separate complex image data of low resolution into real image data and imaginary image data of low resolution. Then, the image processing apparatus may generate real image data and imaginary image data of high resolution by performing interpolation on the real image data and the imaginary image data of low resolution, respectively. Then, the image processing apparatus may generate complex image data of high resolution by synthesizing the real image data and the imaginary image data of high resolution.

When performing such a scaling calculation, scale factor information read from the header H may be used. For example, various options may be applied in accordance with the input image data by increasing or maximizing data accuracy in a scaling calculation process such that the sharpness of an image increases and no or little overflow occurs. The scale factor information of the header H may directly include scale factor values of various options. However, example embodiments are not limited thereto. For example, various combinations of the scale factor values may be predefined, and the scale factor information of the header H may include a set number representing a particular combination of these multiple scale factor combinations.

The prism phase computation may reproduce hologram images corresponding to the left and right eyes in a noise-free space by avoiding lattice point noise generated by a physical pixel structure of a display panel.

Also, the brightness of a hologram image may be adjusted through gamma correction. Gamma information of the header H may include a gamma value that matches the input image data. The image processing apparatus may perform gamma correction using the gamma information read from the header H when performing gamma correction. For example, the image processing apparatus may apply a gamma value such that the hologram image of optimal brightness of −10%, −5%, +5%, +10%, etc. may be reproduced according to an input image.

Then, the image processing apparatus may encode complex values corresponding to each of high resolution pixels in final complex image data into integer values. For example, the image processing apparatus may encode the complex values of the complex image data into 8-bit unsigned integer values. In this manner, hologram data (i.e., CGH image data) with respect to the input image data may be finally generated.

Finally, in operation 150, the image processing apparatus may provide the generated CGH image data to the display panel such that the display panel displays a hologram pattern. A light source may provide illumination light to the display panel. A hologram image that may be viewed by an observer in a virtual three-dimensional (3D) space may be reproduced while the illumination light is diffracted by the hologram pattern displayed on the display panel.

According to example embodiments, since a hologram reproduction region is divided into several layers with respect to a depth in a calculation process for generating the CGH image data, an amount of calculations required for generating the CGH image data may be reduced. Further, according to the example embodiments, each frame may include one header and values of parameters recorded in headers of a plurality of frames may be different from each other. Then, it is possible to express various depths more precisely by changing locations of layers for each image of each frame to optimal locations. Also, since a gamma value or a scale factor value may be changed in real time to match the hologram image to be reproduced for each image of each frame, image quality of the hologram image to be reproduced may be increased or optimized.

Figure 8:
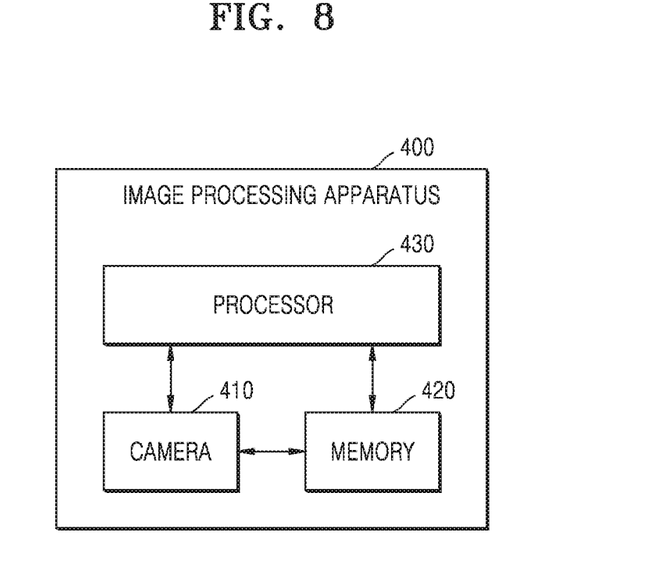
FIG. 8 is a block diagram schematically showing a structure of an image processing apparatus for processing hologram image data according to an example embodiment.

FIG. 8 is a block diagram schematically showing a structure of an image processing apparatus 400 for processing hologram image data according to an example embodiment. Referring to FIG. 8, the image processing apparatus 400 may include a camera 410, a processor 430, and a memory 420. The image processing apparatus 400 may be an electronic apparatus such as a computer, a mobile device, a display apparatus, a wearable apparatus, a digital camera, or the like. The processor 430 may be a central processing unit (CPU), a graphics processing unit (GPU), or the like.

The camera 410 may capture an image and obtain color image data and depth image data. The camera 410 may obtain the color image data and the depth image data in units of frames. The color image data may include red image data, blue image data, and green image data. The red image data, the blue image data, and the green image data may be each one frame. Depth image data may also be one frame.

When a user manually selects a specific mode according to a scene to be captured, parameter value for the camera 410 may also insert the header H having a predetermined parameter value for the selected mode into image data. Instead, the camera 410 may automatically determine the parameter value according to the scene to be captured and insert the header H having the determined parameter value into the image data. Then, the camera 410 may store the color image data and the depth image data including the header H in the memory 420.

The processor 430 may generate CGH image data using the color image data and the depth image data stored in the memory 420 by using the above-described method.

Figure 9:
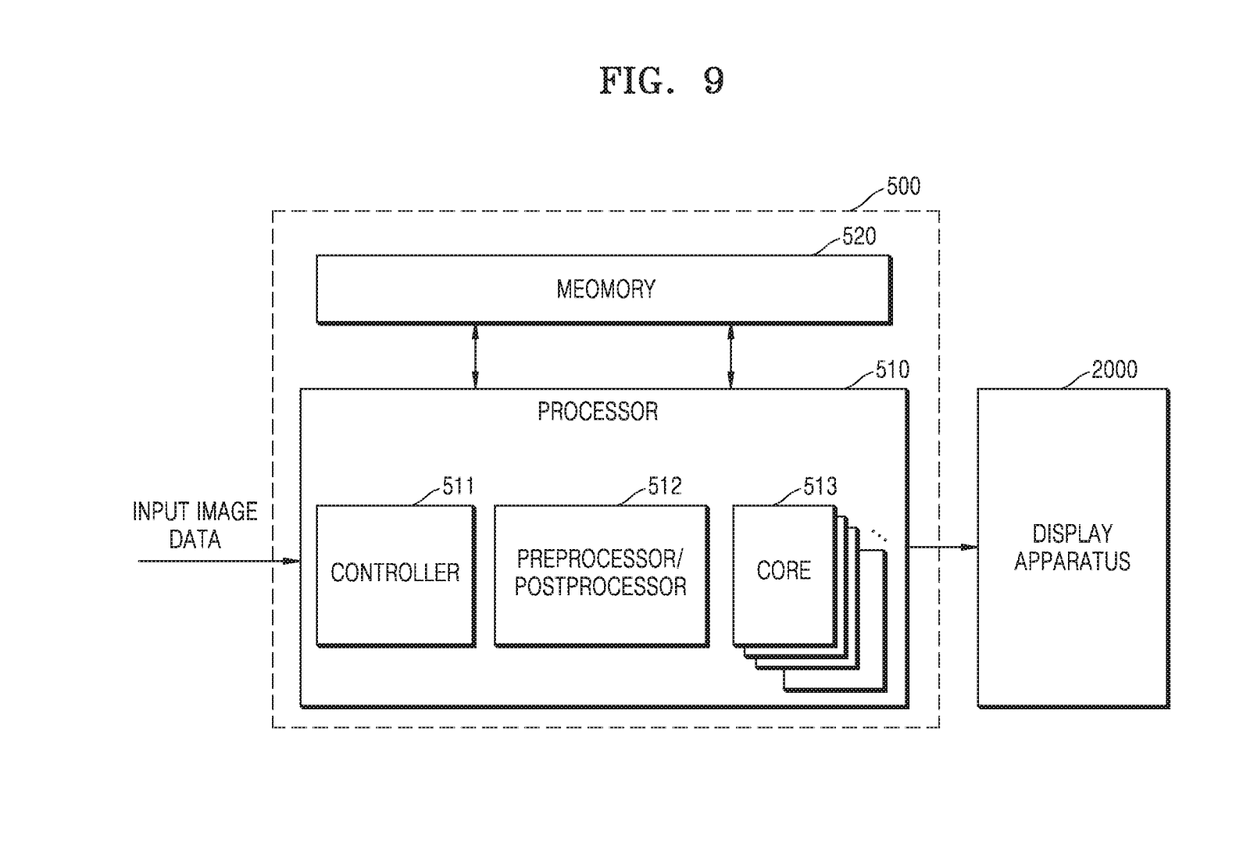
FIG. 9 is a block diagram schematically showing a structure of an image processing apparatus for processing hologram image data according to an example embodiment.

FIG. 9 is a block diagram schematically showing a structure of an image processing apparatus 500 for processing hologram image data according to an example embodiment. Referring to FIG. 9, the image processing apparatus 500 may includes a processor 510 and a memory 520.

The processor 510 may process the image data input to the image processing apparatus 500 to generate CGH image data. For example, the processor 510 may include a controller 511, a preprocessor/postprocessor 512, and at least one core 513. Also, the processor 510 may include a plurality of cores 513. The controller 511, the preprocessor/postprocessor 512, and the at least one core 513 may be implemented as a single microprocessor chip or a plurality of microprocessor chips.

The core 513 may perform an FFT on data. When the processor 510 includes the plurality of cores 513, each of the cores 513 may perform an FFT in parallel. Specifically, each of the cores 513 may in parallel perform an FFT described above with reference to FIGS. 5 and 6.

The controller 511 may generally control an operation of the processor 510. In other words, the controller 511 may control operations of the preprocessor/postprocessor 512 and the core 513.

The preprocessor/postprocessor 512 may process data to be input to the core 513 and data output from the core 513. Here, the data input to be to the core 513 and the data output from the core 513 may include the image data 210 and 310, the intermediate data 220 and 320, and the final data 230 and 330 described above with reference to FIGS. 5 and 6. More specifically, the input image data 210 and 310 may be stored in the memory 520. Thereafter, the CGH image data may be finally generated by the operations of the preprocessor/postprocessor 512 and the core 513 using the image data 210 and 310. In this process, the intermediate data 220 and 320 and the final data 230 and 330 may be generated, and the CGH image data may be generated based on the final data 230 and 330. The preprocessor/postprocessor 512 may perform preprocessing on the data to be input to the core 513 and post-processing on the data output from the core 513.

The image processing apparatus 500 may be connected to a display apparatus 2000. The display apparatus 2000 may generate a hologram image using the CGH image data generated by the image processing apparatus 500.

Figure 10:
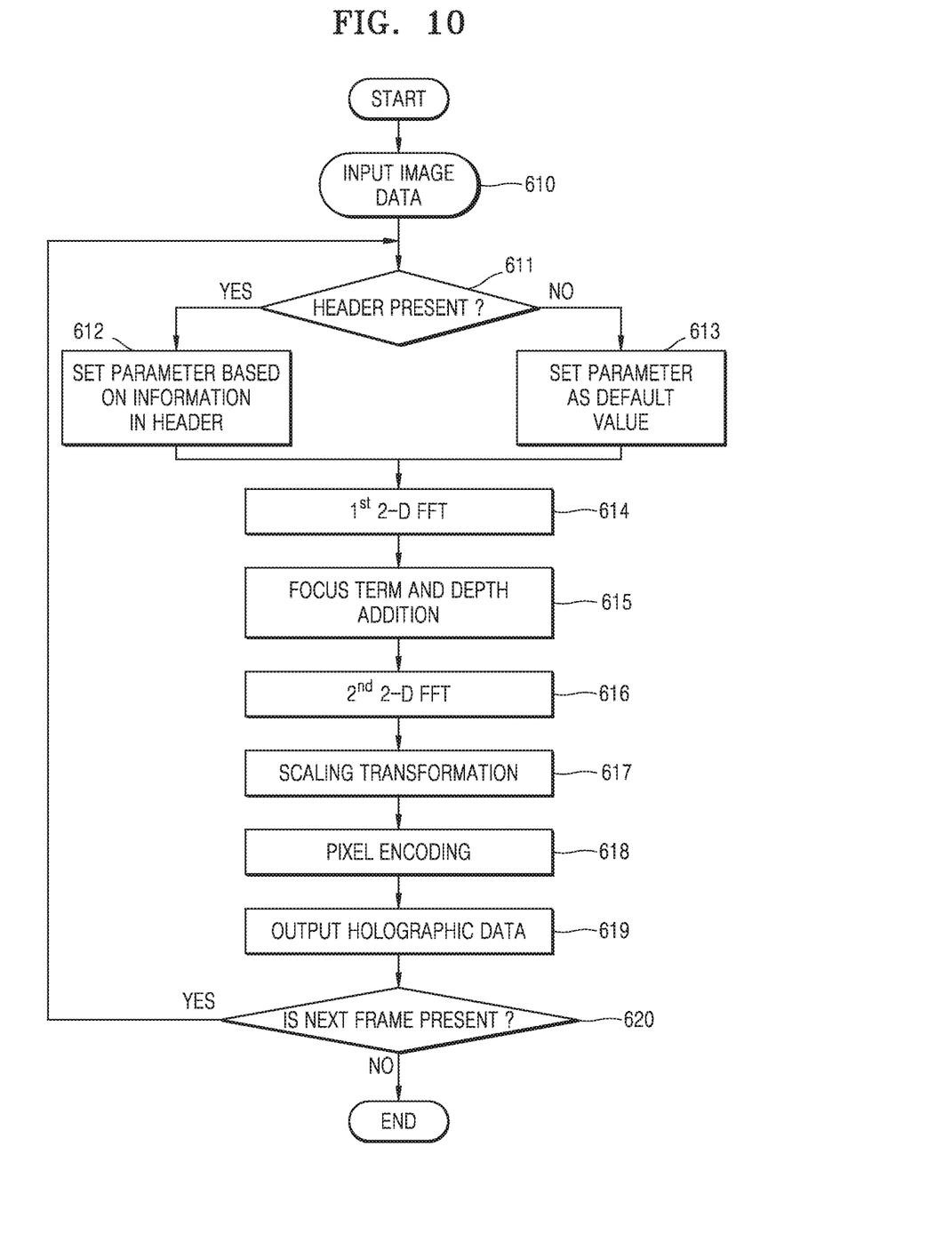
FIG. 10 is a flowchart schematically showing an image processing method of processing hologram image data according to an example embodiment.

FIG. 10 is a flowchart schematically showing an image processing method of processing hologram image data described above.

Referring to FIG. 10, in operation 610, an image processing apparatus may receive image data. In operation 611, the image processing apparatus may confirm an existence of the header H in the input image data. For example, when an identification code present at a predetermined location is equal to a predetermined specific value, the image data may include the header H. When the header H is present in the image data, in operation 612, the image processing apparatus may read the header H and store a parameter recorded in the header H in a memory. However, when the identification code present at the predetermined location is not equal to the predetermined specific value, the header H may not be present in the image data. The image processing apparatus may determine that the image processing method according to the example embodiment is not applied to the image data. Then, in operation 613, the image processing apparatus may store a predetermined default parameter in the memory.

Thereafter, in operation 614, the image processing apparatus may perform a primary 2D FFT as described in detail above with reference to FIGS. 5 and 6. In operation 615, the image processing apparatus may perform a focus term calculation and a depth addition on data obtained through the primary 2D FFT. In this regard, the image processing apparatus may perform the focus term calculation using focus term information about an image of a frame stored in the memory. In operation 616, the image processing apparatus may perform secondary 2D FFT on the data on which the focus term calculation and the depth addition are performed.

When the secondary 2D FFT is completed, in operation 617, the image processing apparatus may perform scaling transformation on a complex image of low resolution into a complex image of high resolution. In this regard, the image processing apparatus may perform a scaling calculation using scale factor information of the image of the frame stored in the memory.

In operation 618, the image processing apparatus may perform pixel encoding. Although pixel encoding and scaling transformation are shown separately in FIG. 10 to emphasize scaling transformation, scaling transformation may be included in pixel encoding. As described above, a pixel encoding operation may further include prism phase computation and gamma correction. When performing gamma correction, the image processing apparatus may use gamma information stored in the memory.

Then, in operation 619, the image processing apparatus may generate CGH image data by encoding complex values corresponding to each pixel of high resolution in final complex image data to integer values. Then, the image processing apparatus may output and provide the CGH image data to a display apparatus.

Finally, in operation 620, the image processing apparatus may confirm whether the input image data further includes image data of a subsequent frame. When currently processed image data is a last frame or a single frame, the image processing apparatus may end operations. However, when there are more subsequent frames to be processed, the image processing apparatus may return to operation 611 and repeat operations 611 to 619 on the subsequent frame.

When image data of one frame at a time is received without receiving image data of a plurality of frames at a time, the image processing apparatus may return to operation 610 of receiving the image data.

While the method and the apparatus for processing hologram image data have been described with reference to the example embodiments shown in the figures, these are merely examples. It should be understood that example embodiments described herein should be considered in a descriptive sense only and not for purposes of limitation. Descriptions of features or aspects within each example embodiment should typically be considered as available for other similar features or aspects in other example embodiments. It will be understood by one of ordinary skill in the art that various changes in form and details may be made therein without departing from the scope as defined by the following claims.

What is claimed is:

1. An image processing method comprising:
   receiving input image data comprising color image data and depth image data;
   reading a header included at a region of the color image data or a region of the depth image data included in the input image data; and
   generating hologram data configured to display a hologram image by performing a Fourier calculation and pixel encoding on the input image data based on at least one parameter recorded in the header,
   wherein the at least one parameter recorded in the header comprises at least one of depth information, scale information, and gamma information.

2. The image processing method of claim 1,
   wherein the header further comprises an identification code, and
   wherein the reading of the header comprises:
      reading the identification code included in the header;
      determining whether the identification code recorded in the header is equal to a predetermined identification code; and
      storing the at least one parameter recorded in the header in a memory when the identification code recorded in the header is equal to the predetermined identification code or storing a predetermined default parameter in the memory when the identification code recorded in the header is not equal to the predetermined identification code.

3. The image processing method of claim 1, wherein the generating the hologram data comprises:
   performing a first Fourier calculation based on a distance between an observer's pupil and a retina;
   performing a focus term calculation and a depth addition using the depth information; and
   performing a second Fourier calculation based on a distance between a display panel configured to display the hologram image and the observer's pupil.

4. The image processing method of claim 3, wherein the depth information comprises location information of a plurality of depth layers of the hologram image.

5. The image processing method of claim 4, wherein the depth information comprises values of a plurality of focus terms corresponding to a location of the plurality of depth layers of the hologram image.

6. The image processing method of claim 4, wherein a plurality of combinations of focus terms corresponding to a plurality of location combinations with respect to the plurality of depth layers are predefined, and
   wherein the depth information corresponds to any one of the plurality of combinations of the focus terms.

7. The image processing method of claim 3, wherein the generating of the hologram data further comprises performing scaling transformation on a first complex image having a first resolution generated by the second Fourier calculation to a second complex image having a second resolution higher than the first resolution,
   wherein scaling transformation is performed based on the scale information.

8. The image processing method of claim 7,
   wherein the generating of the hologram data further comprises performing pixel encoding on complex values of a second complex image having the second resolution to integer values, and
   wherein the performing of the pixel encoding comprises adjusting a brightness of the hologram image based on the gamma information.

9. The image processing method of claim 1, wherein the input image data comprises a plurality of frames respectively comprising a header, and
   wherein parameters recorded in headers of the plurality of frames are different from each other.

10. A non-transitory computer-readable recording medium having recorded thereon a computer program which, on a computer, performs the image processing method of claim 1.

11. The image processing method of claim 1, wherein the depth information comprises variable location information of a plurality of depth layers of the hologram image to adapt locations of the plurality of depth layers in accordance with occupancy by a main object of interest in the holographic image, and
   the image processing method further comprises dynamically changing the locations of the plurality of depth layers of the reproduced holographic image based on the variable location information.

12. An image processing apparatus comprising:
   a processor configured to read a header included at a region of a color image data or a region of a depth image data included in input image data and generate hologram data configured to display a hologram image by performing a Fourier calculation and pixel encoding based on at least one parameter recorded in the header; and
   a memory,
   wherein the at least one parameter recorded in the header comprises at least one of depth information, scale information, and gamma information.

13. The image processing apparatus of claim 12,
   wherein the header comprises an identification code, and
   wherein the processor is further configured to determine whether the identification code included in the header is equal to a predetermined identification code, and store the at least one parameter recorded in the header in the memory when the identification code recorded in the header is equal to the predetermined identification code or store a predetermined default parameter in the memory when the identification code recorded in the header is not equal to the predetermined identification code.

14. The image processing apparatus of claim 12, wherein the processor is further configured to:
perform a first Fourier calculation based on a distance between an observer's pupil and a retina;
perform a focus term calculation and a depth addition based on the depth information; and
perform a second Fourier calculation based on a distance between a display panel configured to display the hologram image and the observer's pupil.

15. The image processing apparatus of claim 14, wherein the depth information comprises location information of a plurality of depth layers of the hologram image.

16. The image processing apparatus of claim 15, wherein the depth information comprises values of a plurality of focus terms each corresponding to a location of the plurality of depth layers of the hologram image.

17. The image processing apparatus of claim 15, wherein a plurality of combinations of focus terms corresponding to a plurality of location combinations with respect to the plurality of depth layers are predefined, and
wherein the depth information corresponds to any one of the plurality of combinations of the focus terms.

18. The image processing apparatus of claim 14, wherein the processor is further configured to perform scaling transformation on a first complex image having a first resolution generated by the second Fourier calculation to a second complex image having a second resolution higher than the first resolution, based on the scale information.

19. The image processing apparatus of claim 18, wherein the processor is further configured to encode complex values of a second complex image having the second resolution to integer values, and adjust a brightness of the hologram image based on the gamma information.

20. The image processing apparatus of claim 12, further comprising:
a camera configured to capture an image and obtain image data,
wherein the camera is further configured to insert a header having a predetermined parameter value for a mode selected by a user into the image data or automatically determine a parameter value and insert the header having the determined parameter value into the image data.

21. The image processing apparatus of claim 12, wherein the depth information comprises variable location information of a plurality of depth layers of the hologram image to adapt locations of the plurality of depth layers in accordance with occupancy by a main object of interest in the holographic image; and
the processor is further configured to dynamically change the locations of the plurality of depth layers of the reproduced holographic image based on the variable location information.

22. An image processing method comprising:
receiving input image data comprising a header, the header being included at a region of a color image data or a region of a depth image data included in the input image data;
reading the header comprising an identification code; and
generating hologram data configured to display a hologram image by performing a Fourier transformation and pixel encoding on the input image data based on at least one parameter included in the header,
wherein the at least one parameter comprises at least one of depth information, scale information, and gamma information, and
wherein the reading of the header comprises determining whether the identification code included in the header is equal to a predetermined identification code, and generating the hologram image based on the at least one parameter when the identification code is equal to the predetermined identification code, and generating the hologram image based on a predetermined default parameter included in a memory when the identification code is not equal to the predetermined identification code.

23. The image processing method of claim 22, wherein the generating the hologram data comprises:
performing a first Fast Fourier Transformation (FFT);
performing a focus term calculation and a depth addition using the depth information; and
performing a second FFT.

24. The image processing method of claim 23, wherein the depth information comprises location information of a plurality of depth layers of the hologram image.

* * * * *